Aug. 28, 1956     C. H. WILLSEY     2,760,537
MECHANISM FOR RECOVERING ALBUMEN
Filed April 1, 1953
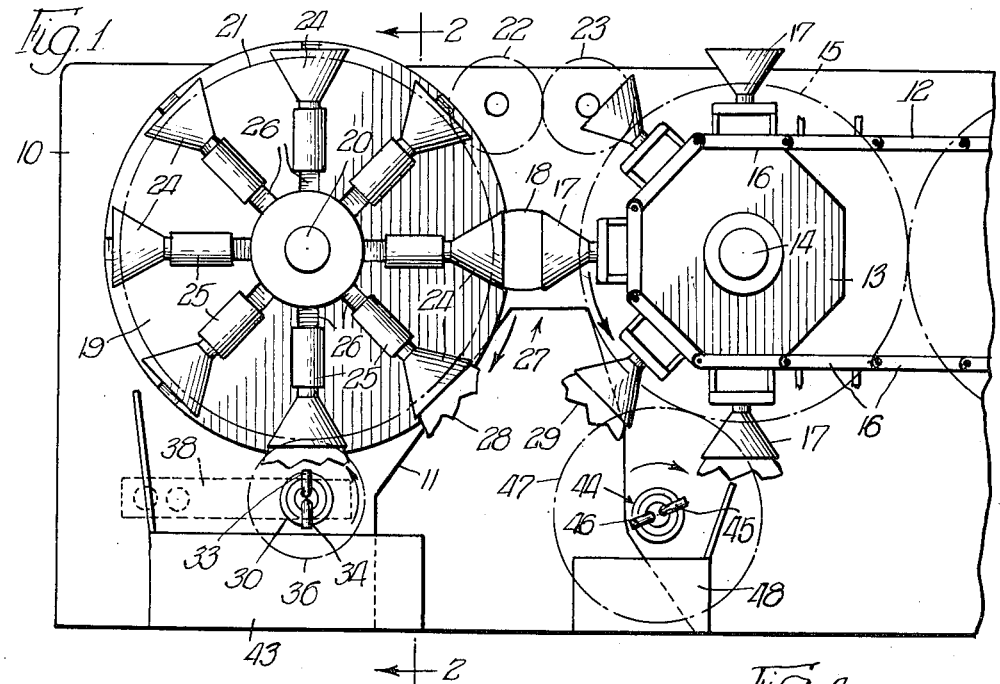
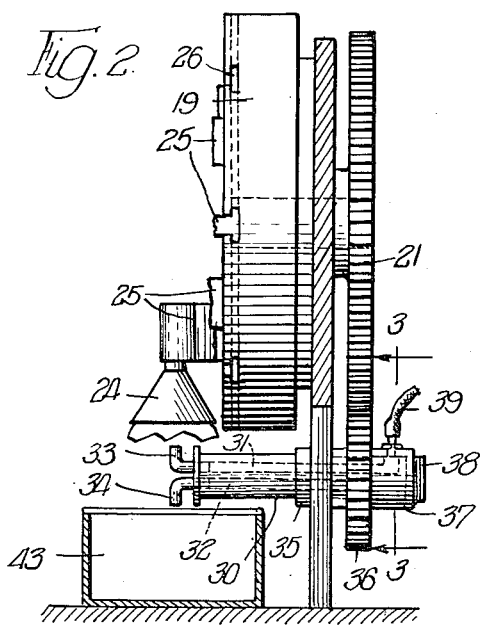
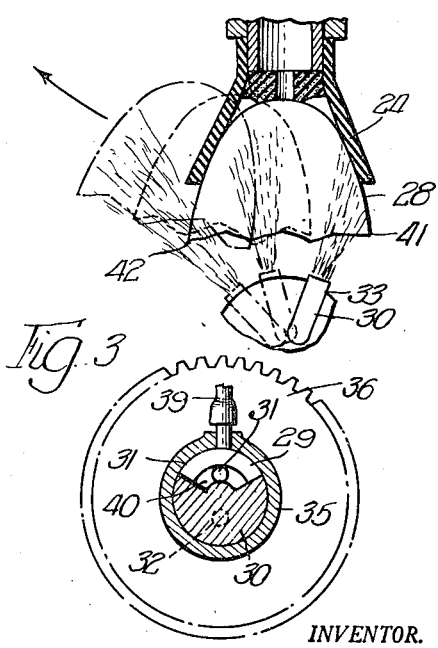
INVENTOR.
Charles H. Willsey,
BY
Cromwell, Greist & Warden
Attys.

United States Patent Office 2,760,537
Patented Aug. 28, 1956

2,760,537

MECHANISM FOR RECOVERING ALBUMEN

Charles H. Willsey, Topeka, Kans.

Application April 1, 1953, Serial No. 346,079

8 Claims. (Cl. 146—2)

This invention relates to egg handling apparatus and is more particularly concerned with improvements in mechanism for cracking or breaking successive eggs and delivering from the broken shell portions the egg contents.

Machines which have been heretofore proposed for breaking or cracking eggs, separating the broken or cracked shells and delivering the contents from the separated shell portions have generally not provided any mechanism for removing from the cracked shell portions the albumen which tends to cling to the interior membrane adjacent the egg shell. The failure to provide for the recovery of this portion of the egg contents has tended to discourage the use or adoption of machines for performing the breaking and separating operations since a satisfactory percentage of albumen can be recovered from the shells in hand breaking operations through the use of various types of mechanism developed for that purpose.

It is a general object of the present invention to provide an improved mechanism adapted to be incorporated in an egg breaking machine for recovering the albumen which adheres to the inner lining of the shell portions after the egg has been broken and the shell portions have been separated to dump the contents therefrom.

It is a further object of the invention to provide a mechanism for recovering the albumen from the separated shell portions of a broken egg which is particularly adapted for incorporation in an egg breaking machine of the type in which the eggs are successively brought to a cracking station where the cracking occurs and the shell portions are separated and moved in a predetermined path away from the cracking station.

It is another object of the invention to provide an albumen recovery mechanism adapted for cooperation with a conveyor mechanism which carries the shell portions away from an egg cracking station which is characterized by a rotating air jet arranged along the path of movement of a broken shell portion and operating in timed relation to the movement of the shell portion to direct a stream of air within the shell and drive the albumen outwardly thereof.

It is a more specific object of the invention to provide in a machine of the character described an albumen recovery device which comprises rotatably mounted air jets arranged along the path of movement of the shells, which air jets are adapted to direct a stream of air within each shell portion in such a manner that it travels from one side edge of the shell to the opposite side edge thereof as the shell moves in its path whereby to force the albumen from the lining of the shell.

It is a further object of the invention to provide an albumen recovery mechanism which is particularly adapted for incorporation in an egg breaking machine of the type disclosed in applicant's copending application Serial No. 315,447, filed October 18, 1952.

These and other objects and advantages will be apparent from a consideration of the mechanism which is shown by way of example in the accompanying drawings, wherein:

Fig. 1 is a front elevation of a portion of an egg cracking machine having mechanism embodying the principles of the present invention incorporated therein;

Fig. 2 is a section taken on the line 2—2 of Fig. 1;

Fig. 3 is an enlarged section taken on the line 3—3 of Fig. 2; and

Fig. 4 is an enlarged schematic view illustrating the principle of operation of the mechanism.

For convenience in illustrating the invention an embodiment thereof is shown which is particularly adapted for incorporation in an egg cracking machine of the general character disclosed in applicant's copending application Serial No. 315,447, wherein, eggs are delivered on end to a series of suction cups, which cups are carried on a continuously traveling conveyor which is mounted for operation in a vertical plane, to a cracking station, where the opposite end of each successive egg is gripped and held, during the cracking operation, by a suction cup on a vertical turret. The turret rotates in timed relation to the egg carrying conveyor, with the egg shell being separated into two portions and the shell portions being carried away from the cracking station in divergent paths by advancing movement of the conveyor and turret, the egg contents being dumped from the shell portions as they separate and being received in a receptacle on a horizontal conveyor which functions to separate the whites and yolks. The details of the egg carrying conveyor, the turret, the suction cups for holding the eggs at the cracking station and the associated mechanisms which perform the cracking operation are described and illustrated in copending application Serial No. 315,447. Only so much of the machine of the copending application as is necessary for understanding the operation of the albumen recovery mechanism of the present invention is illustrated and described herewith.

Referring to the drawings the recovery mechanism may be conveniently supported on a vertically extending frame plate 10 having an aperture 11 through which an egg contents receiving and separating conveyor (not shown) is adapted to move. An egg carrying conveyor 12 is supported on the forward face of the frame plate 10 with one end traveling on an octagonal drum 13, which is rotatably mounted on plate 10 for movement around the forwardly projecting supporting shaft or axle 14, and which is driven by a gear 15 having suitable connection with a power drive mechanism (not shown). The conveyor 12 comprises a series of chain forming pivotally connected links or plates 16 each of which carries an egg holding suction cup 17 and a suitable shell cracking mechanism (not shown). The eggs 18 are delivered to the conveyor 12 and positioned on end in the suction cups 17 by suitable feed mechanism (not shown). As the conveyor 12 moves the cups 17 around the drum 13 the interior of each cup 17 is connected through the drum 13 with a suitable vacuum line which operates to hold the egg therein until it reaches the horizontal or cracking position.

A turret 19 is arranged for rotation about the forwardly extending supporting shaft or axle 20 and is driven by gear 21 and pinions 22 and 23, the latter connecting the gear 21 in driving relation with the driven gear 15. The turret 19 carries a series of egg holding suction cups 24 which are mounted on slidable frames 25 arranged to move in radially extending guideways 26 in the forward face of the turret 19 and mechanism (not shown) is provided for moving each successive cup 24 into opposed cooperating relation with a cup 17 on the conveyor 12 as the latter reaches the cracking station indicated at 27. Provision is made for connecting each of the suction cups 24 with a source of vacuum through the turret 19 as each cup approaches the cracking station 27. The cracking mechanism is operated automatically to crack the egg shell and permit the egg to be divided into separate portions by advancing movement of the cups 17 and 24 in their diverging paths, which dumps the contents of the egg and allows it to fall by gravity into a receiving receptacle on the separating conveyor beneath the same.

As the egg shell portions 28 and 29 move beyond or away from the cracking station 27 they carry a certain amount of the albumen which is not released from the shell portions upon the dumping of the contents of the egg. The mechanism which is provided for recovering the remaining albumen from the shell portion 28 is mounted below the turret 19. It comprises a forwardly extending cylindrical member 30 (Fig. 2) which is journaled in the vertical supporting plate 10 and which has internal axially extending passageways 31 and 32 terminating at the outer ends thereof in oppositely directed angular nozzles 33 and 34 which move in a plane approximately in the center of the cups 24 when the member 30 is rotated. The cylindrical member 30, which is supported by a suitable bearing 35 in the vertical plate member 10, carries at its outer or rear end a pinion 36 which engages in driving relation with the gear 21 operating the turret 19. The passageways 31 and 32 in the rotating member 30 extend in an axial direction to a port ring 37, which is supported on a fixed bracket 38 at the end of the member 30, and are connected through the same with an air pressure line 39. The port ring 37 is provided with a port 40 on the face which engages the end of rotating member 30, which is adapted to align with the ends of the passageways 31 and 32 and which supplies a blast or stream of air to the rotating nozzles 33 and 34 during a period from the time when a nozzle approaches the trailing edge 41 of the shell portion 28 (Fig. 4) and extending to the time when the nozzle reaches the leading edge 42 of the shell portion 28. The nozzle carrying member 30 is rotated at a greater speed than the speed at which the shell portion 28 is moving so that the air blast from the nozzle sweeps across the inside of the shell portion 28 from the trailing edge 41 to the leading edge 42 while the shell portion 28 is traveling in the same direction of rotation of the nozzle. The two nozzles 33 and 34 operate, of course, upon successive egg shell portions 28 which are carried in the cups 24. A receptacle 43 is positioned below the nozzles 33 and 34 to receive the albumen as it is blown from the shell portion by the nozzle.

A similar recovery mechanism 44 is provided beneath the drum 13 at the end of conveyor 12 for operation on the shell portions 29 carried by the conveyor suction cups 17. The mechanism 44 is of substantially the same construction as the recovery mechanism described for blowing the albumen from the shell portion 28. It is also supplied with two oppositely disposed nozzles 45 and 46 which are arranged to be connected with a source of air pressure at the proper time during their rotation to direct a blast or stream of air against the inner wall of the shell portion 29 and which are rotated in a clockwise direction so that the air sweeps across the shell portion 29 from the trailing edge to the leading edge thereof while the suction cup 17 carrying the shell portion 29 moves past the mechanism 44. The two nozzles 45 and 46 operate on successive shell portions 29 as they are carried by the same on the conveyor 12. The mechanism 44 is journaled in the plate 10 and is rotated by means of a pinion 47 at the end thereof which engages in driving relation with the driven gear 15. It is connected with a suitable source of compressed air in the same manner as described in connection with the recovery mechanism for the shell portions 28. A receptacle 48 is positioned beneath the mechanism 44 to receive the albumen which is blown from the shell portions 29.

It will be understood, of course, that mechanism embodying the principle features of the present invention may be incorporated in a cracking machine of a substantially different construction from that disclosed in copending application Serial No. 315,447. It may be combined with other types of cracking machines in which the egg shell is cracked and the portions are separated to dump the contents therefrom with the shell portions being carried away from the cracking station along a predetermined path, the recovery mechanism being adapted to be located along the path of travel of the separated shell portions and being arranged to cooperate with the carrying mechanism for the same.

I claim:

1. In an egg cracking machine, a cracking station, a rotating turret mounted at said cracking station and egg shell holders thereon adapted to grip one end of successive eggs while they are being cracked and thereafter to move the separated shell portion away from the cracking station, an air mechanism mounted adjacent said turret, said air mechanism having a nozzle and means connected to said nozzle for rotating said nozzle about a fixed axis in a direction opposite to the direction of rotation of said turret and at a speed which is greater than the peripheral speed of said shell holders, and means to deliver air to said nozzle so that it will wipe across the inside surfaces of the successive shell portions from the trailing to the leading edge thereof as the shell holders move the same past the nozzle whereby to remove from the shell portions the albumen which otherwise clings thereto.

2. In an egg cracking machine having a cracking station, a traveling conveyor and egg shell holders thereon movable past said cracking station, said holders being adapted to grip one end of successive eggs while they are moved to the cracking station and thereafter to move the separated shell portions away from the cracking station, an air mechanism mounted adjacent said conveyor, said air mechanism comprising a rotatably mounted nozzle, means connected with said nozzle for rotating said nozzle at a speed which is greater than the speed of advancing movement of said holders, and means connected to said nozzle for delivering air to said nozzle in timed relation to the movement thereof to cause a stream of air delivered therethrough to move progressively across the inside surfaces of each successive shell portion from the trailing to the leading edge thereof as the holders move the same past the nozzle thereby to remove from each shell portion the albumen which otherwise clings thereto.

3. In an egg cracking machine, a cracking station, a rotating carrier at said station, and egg shell holders on said carrier extending in a radial direction and adapted to grip one end of successive eggs while they are being cracked at said cracking station and thereafter to move separated shell portions away from the cracking station, an air mechanism mounted adjacent the periphery of said carrier, said air mechanism comprising a pair of rotatably mounted nozzles and means connected to said nozzles for rotating said nozzles about an axis generally parallel to the axis of rotation of said carrier and at a speed which is greater than the speed of movement of said shell holders, said nozzles extending in opposite directions radially of their axis of rotation and causing a stream of air delivered therethrough to strike the inside surfaces of the successive shell portions and move across the same at a faster rate than the advancing movement of the shell holders as said carrier rotates whereby to remove from the shell portions the albumen which otherwise clings thereto.

4. In an egg cracking machine, a cracking station, a continuously traveling conveyor adjacent said station and egg shell holders on said conveyor adapted to grip one end of successive eggs while they are being cracked at said station and thereafter to move separated shell portions away from the cracking station, an air mechanism mounted adjacent said conveyor, said air mechanism comprising a nozzle rotatably mounted adjacent said conveyor, means connected to said nozzle for rotating said nozzle about a fixed axis to cause the nozzle to move in the direction of travel of said conveyor and at a predetermined speed relative to the speed of movement of said conveyor and means connected to said nozzle to deliver air to said nozzle in timed relation to the movement of said nozzle and said conveyor so that a stream of air delivered therethrough moves from the trailing edge toward the leading edge across the inside surface of each successive shell portion carried by said holders to thereby remove from said shell portion the albumen which otherwise clings thereto.

5. In an egg cracking machine, a cracking station, a continuously rotating carrier adjacent said cracking station and egg shell holders on said carrier adapted to grip one end of successive eggs while they are being cracked at said station and thereafter to move the separated shell portions away from the cracking station, an air mechanism mounted adjacent the periphery of said carrier, said air mechanism comprising oppositely directed nozzles rotatably mounted for movement in the plane of operation of said shell holders, means connected to said nozzles for rotating said nozzles about a fixed axis in a direction opposite the direction of rotation of said carrier about its axis and in timed relation thereto and at a faster rate of speed, and means connected to said nozzles to deliver air to said nozzles in timed relation to the movement of said carrier to cause a stream of air delivered therethrough to travel across the inside surface of successive shell portions carried by said holders from the trailing edge to the leading edge thereof whereby to remove from said shell portions the albumen which otherwise clings thereto.

6. In a mechanism for removing albumen from the separated shell portions of broken eggs, means for carrying successive shell portions in a predetermined path, an air nozzle rotatably mounted adjacent said shell carrying means and at a predetermined point along said path, means connected to said nozzle for supplying a stream of air intermittently to said nozzle and for controlling the supply of said air, and means connected to said nozzle for rotating said nozzle about its axis in the same direction as the direction of advancing movement of the shell carrying means whereby said stream of air will first strike the inside surface of each successive shell portion on said carrying means adjacent the trailing edge thereof and then move across said inside surface toward the leading edge thereof thereby to carry the remaining albumen out of said shell portion at the leading edge thereof.

7. In an egg cracking machine, a cracking station, continuously traveling means for mounting cooperating shell holders adjacent said cracking station, said means moving said shell holders to initially grip opposite ends of successive eggs at said cracking station and thereafter to advance the shell portions of an egg which has been cracked at said cracking station in opposite directions away from the cracking station, whereby the contents is dumped therefrom, an air mechanism mounted adjacent said shell holder mounting means and along the path of travel of said shell portions, said air mechanism comprising a nozzle mounted for rotational movement approximately in the plane of operation of said shell holder mounting means, said nozzle extending radially of the axis of rotation thereof, and means connected to said nozzle for rotating said nozzle in a direction relative to the direction of advancing movement of said shell holders and in timed relation to the movement of the latter to direct a stream of air into the shell portions carried in said continuously advancing shell holders and to move said stream of air across the interior walls of successive shell portions from the trailing to the leading edge thereof at a greater speed than the speed of the shell holders whereby to force the remaining albumen out of said shell portions with a sweeping movement.

8. In an egg cracking machine, a cracking station, a traveling conveyor adjacent said station and egg shell holders on said conveyor adapted to grip one end of successive eggs while they are being cracked at said station and thereafter to move separated shell portions away from the cracking station, an air mechanism mounted adjacent said conveyor, said air mechanism comprising a pair of nozzles mounted for rotation about a fixed axis located adjacent said conveyor along the path of advancing movement thereof, said nozzles being arranged in radially extending oppositely disposed relation relative to the axis of rotation to direct a stream of air into successive shell portions as the latter are advanced away from said cracking station, means connected to said nozzles for rotating said nozzles about said axis and in the direction of advancing movement of said conveyor, and means connected to said nozzles for delivering air successively to the respective nozzles in timed relation to the rotational movement thereof to cause a stream of air delivered therethrough to wipe across the inside surfaces of each successive shell portion from the trailing to the leading edge thereof as it is moved past said air mechanism by said conveyor whereby to remove from the shell portion the albumen which otherwise clings thereto.

References Cited in the file of this patent

UNITED STATES PATENTS

| | | |
|---|---|---|
| 498,488 | Power | May 30, 1893 |
| 1,669,492 | Shields | May 15, 1928 |
| 1,945,788 | Pilley | Feb. 6, 1934 |
| 2,090,963 | Reese | Aug. 24, 1937 |
| 2,218,686 | Showers | Oct. 22, 1940 |
| 2,634,737 | Rowe | Apr. 14, 1953 |

FOREIGN PATENTS

| | | |
|---|---|---|
| 155,392 | Switzerland | Sept. 1, 1932 |